Figure 3:
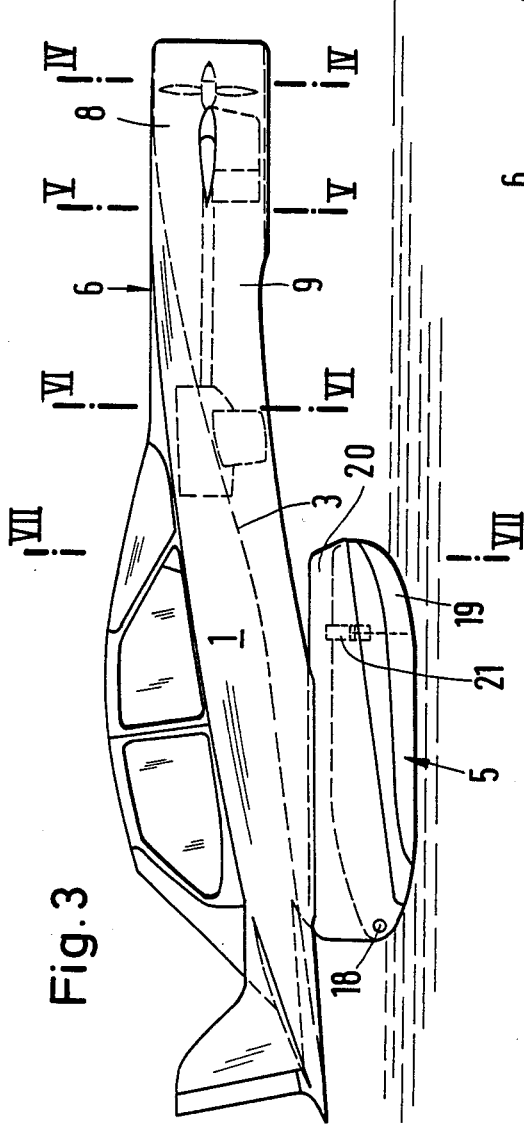

United States Patent [19]

Blum

[11] Patent Number: 4,712,630
[45] Date of Patent: Dec. 15, 1987

[54] GROUND EFFECT VEHICLE

[76] Inventor: Albert Blum, Scheiderhöhe, 5204 Lohmar 1, Fed. Rep. of Germany

[21] Appl. No.: 755,730

[22] Filed: Jul. 17, 1985

[30] Foreign Application Priority Data

Aug. 1, 1984 [DE] Fed. Rep. of Germany ....... 3428281

[51] Int. Cl.$^4$ .................. B60V 1/08; B60V 1/14
[52] U.S. Cl. .................. 180/117; 114/67 A; 114/283; 244/105
[58] Field of Search ............. 180/117, 119, 120, 121; 114/67 A, 272, 273, 283; 244/12.1, 45 A, 23 R, 23 A, 100 A, 101, 105

[56] References Cited

U.S. PATENT DOCUMENTS

| 2,364,677 | 12/1944 | Warner | 244/12.1 |
| 2,455,955 | 12/1948 | Smith | 244/10 J |
| 2,718,367 | 9/1955 | Doolittle | 114/105 |
| 2,932,468 | 4/1960 | Kappas | 180/117 |
| 3,030,051 | 4/1962 | Kerry et al. | 244/23 A |
| 3,070,327 | 12/1962 | Dornier | 114/67 A |
| 3,118,513 | 1/1964 | Cockerell | 180/120 |
| 3,135,480 | 6/1964 | Chaplin | 244/12.1 |
| 3,190,582 | 6/1965 | Lippisch | 180/117 |
| 3,289,977 | 12/1966 | Staats | 244/23 R |
| 4,151,893 | 5/1979 | Mantle | 244/23 R |
| 4,365,578 | 12/1982 | Schellhaas | 114/272 |

FOREIGN PATENT DOCUMENTS

| 3428281 | 1/1986 | Fed. Rep. of Germany | 244/23 R |
| 746761 | 3/1933 | France | 244/10 J |
| 974203 | 9/1950 | France | 244/10 J |
| 1263704 | 3/1960 | France | 180/117 |
| 1281653 | 2/1961 | France | 244/23 R |
| 1266804 | 6/1961 | France | 180/117 |
| 1339153 | 8/1963 | France | 244/23 R |

Primary Examiner—John J. Love
Assistant Examiner—Mitchell J. Hill
Attorney, Agent, or Firm—Brooks & Kushman

[57] ABSTRACT

A ground effect vehicle consists of a central, wing-like support body (1), floats (5) and/or undercarriage units located on both sides of the support body, a thrust generator (11) located in front of the support body, a control surface (14, 16) and a cabin (17), located on top of the support body for at least one person and, if required, for payloads. In order to increase the ground effect and to realize the ground effect even at low speeds, a nose (6) extending far forwards is provided in front of the support body (1), which nose forms an airflow duct (7) directed under the support body, the thrust generator (11) being located under the front region of the nose (6) in or immediately in front of the airflow duct (7).

19 Claims, 10 Drawing Figures

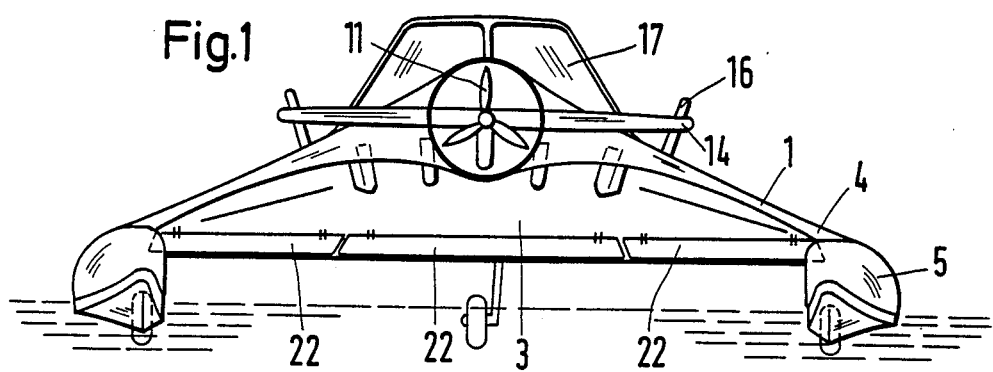
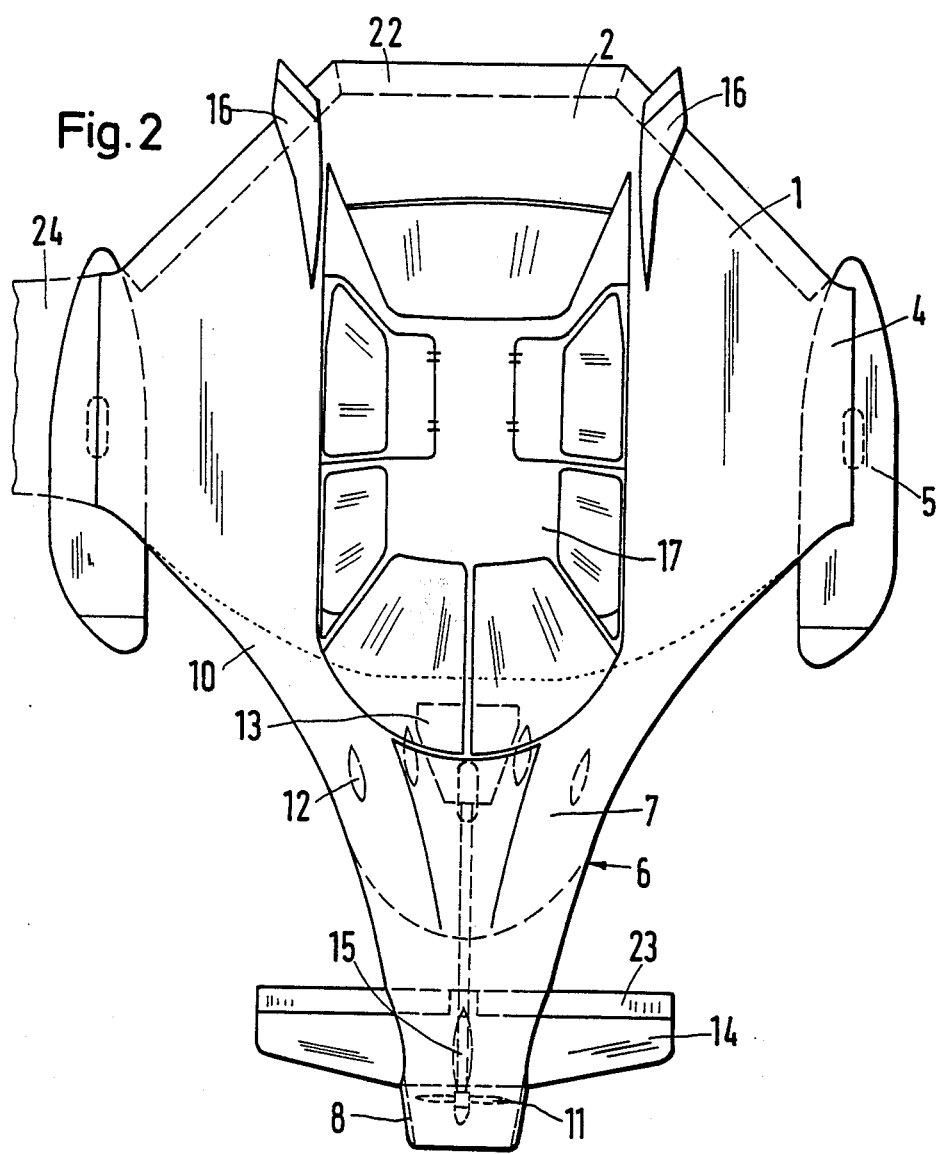

Fig. 8
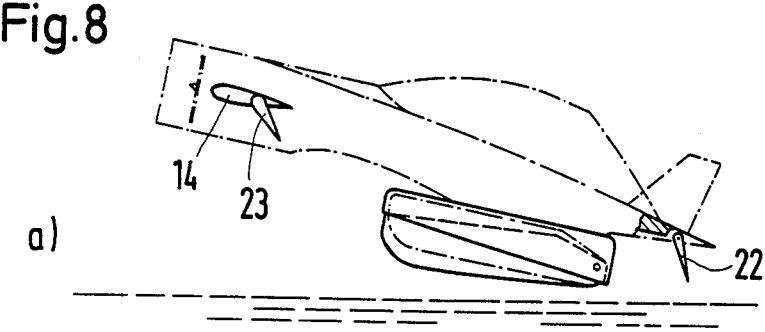
a)
b)
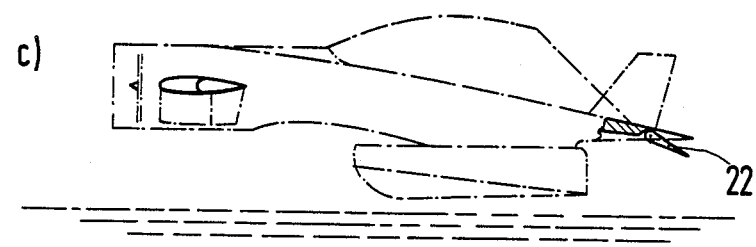
c)

GROUND EFFECT VEHICLE

The invention concerns a ground effect vehicle with a central, wing-like support body, floats and/or undercarriage units located on both sides of the support body, a thrust generator located in front of the support body, a control surface and a cabin, located on top of the support body, for at least one person and, if required, for payloads.

In ground effect vehicles, the air flowing into the hollow space under the support body generates a build-up of air pressure during flight near the surface of the ground or water; this build-up of air pressure acts in a similar manner to an air cushion on which the vehicle can slide. This effect substantially reduces the resistance and the vehicle is automatically stabilised at a height corresponding to the engine power selected. Because of the low resistance, the vehicle only requires small propulsion powers.

In a known ground effect vehicle of the type quoted (GB reference: Air-Cushion Vehicles (Flight International Supplement) of 25th July 1964, page 80), which is designed as a single-propeller aircraft, the propulsion system—which is designed as a propeller—is located directly in front of the support body, the rotational axis of the propeller being located above the supporting surfaces. In this known vehicle, therefore, the propeller is mainly used for generating thrust, the airflow generated by the propeller escaping essentially, over the vehicle and over the support surfaces when the vehicle is at rest or is being started. It is only at higher velocities that a build-up of air pressure under the support body is caused by the travelling speed and realises the ground effect.

The object of the invention is further to improve the ground effect vehicle of the type mentioned initially in such a way that the ground effect is increased, this ground effect being realised even at low speeds.

This object is attained, according to the invention, in that a nose extending far forwards is provided in front of the supporting body, which nose forms an airflow duct directed under the support body, and that the thrust generator is located under the front region of the nose in or immediately in front of the airflow duct.

The result of the design according to the invention is that the airflow generated by the propulsion system not only generates forward propulsion but simultaneously generates the build-up of air pressure under the surface-type support body and by this means directly generates a powerful lift by ground effect so that a rapid increase in speed can occur.

The nose is preferably designed in the foremost region as an intake diffuser, the thrust generator preferably being located in the front section of the intake diffuser.

The airflow duct can be formed by a roof-like guide profile, cambered towards the top and open towards the bottom, which guide profile follows on from the intake diffuser.

The guide profile preferably widens towards the support body and is, in fact, of such a shape that it has approximately the same width as the support body in the region in which it joins the latter. This ensures that the total width of the support body is subjected to the flow even at low speeds. In order to support this effect, air guide vanes can be provided on the bottom of the guide profile for the optimum distribution, over the total width of the support body, of the airflow generated by the propulsion system. These air guide vanes can be adjustable to suit the flight condition and may even be retractable into the profile at high speeds.

The support body of the vehicle can be a delta wing. The point of the delta of the support body can then, for example, point rearwards. The rear point of the delta of the support body is preferably truncated.

The bottom of the support body bridges over an upwards cambered space, whereas the side and rear edges are drawn downwards. This shape supports the build-up of air pressure.

The rear edge and/or the side edges of the support body can be provided with adjustable flaps so that the build-up of air pressure can be matched to the particular flight condition.

Since the advantages of the ground effect vehicle are particularly associated with water surfaces, the undercarriage units are preferably designed as floats. However, so that the vehicle can also take off and land on solid runways additional undercarriage units can also be provided. If the support body is designed as a delta wing, the floats and/or undercarriage units are preferably located on or under the two transverse ends of the delta wing.

In a preferred embodiment of the vehicle according to the invention, the floats and/or undercarriage units can be tipped in a vertical plane lying parallel to the direction of travel. This makes it possible to adjust the inclination of the vehicle in the condition where it is in contact with the water or the ground. During the take-off phase, it is advantageous to have the nose of the vehicle relatively high. This improves the take-off behaviour, on the one hand, and, on the other, particularly if the thrust generator is an airscrew, effectively avoids the airscrew touching the water or the ground.

The tipping axes of the floats and/or undercarriage units can be located at their rear ends. By this means, the pivoting point of the vehicle is displaced relatively far towards the rear and this improves the effectiveness of the pivoting movement.

The floats and/or undercarriage units, or those parts of the floats which are immersed in the water and those parts of the undercarriage units which come into contact with the ground, can be installed so that they are elastically sprung relative to the vehicle. This improves the travelling behaviour of the vehicle when in contact with the water or the ground.

Each float can consist of an upper and a lower shell with a leak-tight mutual engagement, the upper shell being rigidly connected to the vehicle, whereas the lower shell is adjustable relative to the upper shell.

In order to pivot the floats and/or undercarriage units, or the shells, relative to one another, a piston/cylinder unit, which is simultaneously designed as a spring/damper element, can be provided.

In the case of larger vehicles or vehicles which are intended to transport larger loads, the thrust generator can have two or more engines located adjacent to one another.

The ground effect vehicle according to the invention can also be used without difficulty as an aircraft, given appropriate equipment. For this purpose, additional support surfaces, which increase the lift, are preferably provided on both sides of the delta wing.

Figure 6:
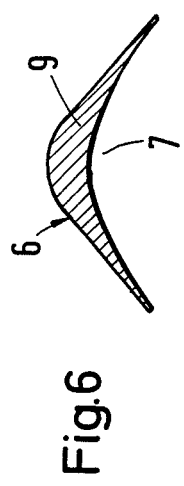
Figure 7:
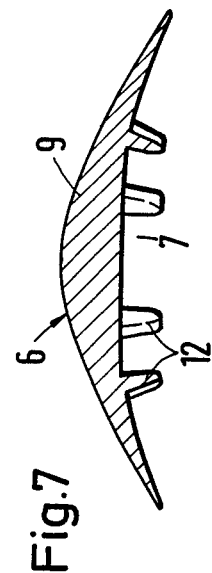
Figure 4:
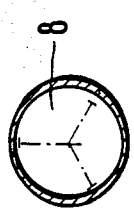
Figure 5:
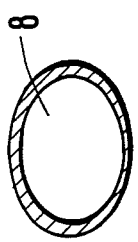

The invention is illustrated in the drawing by means of an example and is described below in detail, with reference to the drawing in which:

FIG. 1 shows the front view of an embodiment example of a ground effect vehicle, FIG. 2 shows a plan view of the vehicle shown in FIG. 1, FIG. 3 shows a side view of the vehicle shown in FIG. 1, FIG. 4 shows a cross-section along the line IV—IV in FIG. 3, FIG. 5 shows a cross-section along the line V—V in FIG. 3, FIG. 6 shows a cross-section along the line VI—VI in FIG. 3, FIG. 7 shows a cross-section along the line VII—VII in FIG. 3, FIG. 8 shows three different operating phases of the vehicle.

As shown in FIGS. 1 to 3 of the drawing, the ground effect vehicle consists essentially of a central, surface-type support body 1, which has the shape of a wing. The shape of the wing is related to a delta wing whose point 2 is directed towards the rear. In the embodiment example shown, however, the point is truncated.

The delta wing is designed with an upwards camber underneath and bridges over a hollow space 3.

Floats 5, which make it possible for the vehicle to float on a water surface, are located in the region of the outwards directed corners 4 on both sides of the delta wing. Undercarriage units can also be provided without difficulty instead of the floats 5 so that the vehicle can take off and land on solid runways. As an alternative, a combination of floats and undercarriage units is also possible.

A nose 6 extending far forwards is provided in front of the support body 1 and forms an airflow duct 7 directed under the support body 1. The front end of the nose 6 is designed as an intake diffuser 8 which, in the region of the sections IV and V, has a closed shape gradually widening towards the rear. Behind the intake diffuser, the airflow duct 7 is formed by a roof-like guide profile 9, cambered towards the top and open towards the bottom, which widens towards the support body 1 and, in the connection region 10, which is shown dotted in FIG. 2, has approximately the same width as the support body. The actual wing profile generating the lift therefore only begins at the connecting region 10 while the nose extending forwards mainly acts to guide the air under the support body.

Located in the front section of the intake diffuser 8 is a thrust generator, designed as an airscrew 11, which—in combination with the airflow duct 7—forces all the air it pumps under the support body even when the vehicle is at rest so that an air cushion builds up under the support body. So that the air led out of the airflow duct 7 actually flows over the total width of the support body 1, air guide vanes 12 are provided in the rear section of the air flow duct 7 on the bottom of the nose 6, these air guide vanes 12 distributing the air over the total width of the wing profile even when the vehicle is at rest. The air guide vanes 12 are adjustable so that their position can be matched to the particular flight condition.

The driving engine 13 of the airscrew 12 is located relatively far towards the rear so that the centre of gravity of the vehicle does not lie too far forward.

Various control surfaces are used for controlling the vehicle. An elevator 14 is provided on both sides directly behind the airscrew 11 in the front region of the nose 6; this elevator 14 is partially located on both sides of the nose 6 and, in addition, extends right through the airflow duct 7. A small fin 15 is also located in the region of the airflow duct 7. In addition, two larger fins 16, arranged with a lateral distance between them, are provided on top of the rear end of the support body 1.

A cabin 17 is located on top of the support body 1; in the embodiment examples shown in the drawing, this cabin provides space for four to six persons and also for luggage.

With this particular purpose of facilitating takeoff and landing, the floats 5 located on both sides of the support body 1 can be tipped in a vertical plane lying parallel to the direction of travel. The two tipping axes 18 of the floats 5 are then located in the rear end regions of the floats. In the embodiment example shown in the drawing, the floats 5 consist of two shell-shaped parts 19 and 20, the upper shell 20 being seated firmly on the support body 1 whereas the lower shell 19, which penetrates into the water, is linked to the upper shell by means of the tipping axis 18 and is sealed so as to be water-tight relative to the upper shell. A piston/cylinder unit 21, which simultaneously acts as a spring-/damper element, is used for pivoting the lower float shell 19.

In the take-off phase shown in FIG. 8a, the floats 5 are in their most extended tipping position so that the front end of the nose 6 points obliquely upwards. Even before the vehicle starts moving, the total propulsion air provided by the thrust generator is led under the support body 1. So that air pressure can build up under the support body 1, air flaps 22, provided at the rear and side edges of the delta wing, are pivoted into their lowest position so that the air cannot escape so rapidly from the hollow space 3. Due to the ground effect, the vehicle gets rapidly under way and even after a short take-off run rises slightly from the water. So that the obliquely upwards take-off attitude is retained even during this take-off phase (when the floats 5 no longer penetrate into the water, or no longer penetrate completely into the water), the control flaps 23 of the control surface 14 are directed obliquely downwards. When the vehicle is no longer in contact with the water and has adopted its stable cruise position, the control flaps 23 are pivoted into the opposite position—as shown in FIG. 8b—until the nose 6 adopts an approximately horizontal attitude. The air flaps 22 at the rear edge of the delta wings are simultaneously pivoted upwards in order to reduce the air resistance. If the vehicle has then adopted its final cruise attitude, the control flaps 23 of the elevator 14 are pivoted into their neutral position shown in FIG. 8b.

In order to initiate landing, the vehicle is brought into the position shown in FIG. 8a by appropriate actuation of the control flaps 23 and the air flaps 22, and the floats 5 are driven into their tipped position so that the vehicle retains its oblique attitude with raised nose even after touch-down.

The ground effect vehicle described is extremely economical. The vehicle experiences strong lift at relatively low speeds directly after starting due to the ground effect so that the travelling resistance is greatly reduced and the vehicle can lift off relatively rapidly. The travelling speed can be rapidly increased without a large expenditure of energy.

The vehicle is also very flexible in use. If equipped with an airscrew, the vehicle can be used as a simple high speed boat which lifts slightly out of the water with increasing speed. In the next extension stage, the vehicle, which can be equipped with either an airscrew or a jet engine, can be used as a ground effect vehicle which can hover at a distance above a water surface or even ground. Take-offs and landings are possible both on water and runways, depending on the equipment. In the subsequent extension stage, the vehicle can be used as a flying boat and also as an aircraft. If the vehicle is to be used as an aircraft, additional support surfaces 24 to increase lift can be provided on both sides of the delta wing.

I claim:

1. Ground effect vehicle with a central, wing-like support body elongated along a longitudinal axis, at least one set of floats and undercarriage units located on both sides of the support body, a thrust generator supported on the support body and located in front of the support body and a nose of the vehicle, a control surface and a cabin located on top of the support body, for at least one person and for payloads, characterised in that the nose defines an airflow duct (7) under the support body (1), the airflow duct (7) being disposed between the thrust generator (11) and the support body (1) at the bottom side of the nose (6), the airflow duct being formed by a roof-like guide profile (9) adjacent the support body (1) and the thrust generator (11) being sized to force a sufficient amount of airflow towards and directly under the entire support body along an axis parallel to the longitudinal axis to cause the propulsion and increase the aerodynamic lift of the vehicle, and that the thrust generator (11) is located under the front region of the nose (6) in the airflow duct (7).

2. Ground effect vehicle according to claim 1, characterised in that the nose (6) is designed in the foremost region as an intake diffuser (8).

3. Ground effect vehicle according to claim 2, characterised in that the thrust generator (11) is located in the front section of the intake diffuser (8).

4. Ground effect vehicle according to claim 2, characterised in that the airflow duct (7) is formed by a roof-like guide profile (9) which guide profile (9) follows on from the intake diffuser (8).

5. Ground effect vehicle according to claim 4, characterised in that the guide profile (9) widens towards the support body (1).

6. Ground effect vehicle according to claim 5, characterised in that the guide profile (9) is joined to the support body (1) and has approximately the same width as the support body (1) in the region in which it joins the guide profile.

7. Ground effect vehicle according to claim 6, characterised in that air guide vanes (12) are provided on the bottom of the guide profile (9) for the optimum distribution, over the total width of the support body (1), of the airflow generated by the thrust generator.

8. Ground effect vehicle according to claim 1, characterised in that the support body (1) is delta-shaped.

9. Ground effect vehicle according to claim 8, characterised in that the delta-shaped support body (1) points rearwards.

10. Ground effect vehicle according to claim 9, characterised in that the support body is shaped like a truncated delta.

11. Ground effect vehicle according to claim 10, characterised in that the bottom of the support body (1) comprises a second roof-like guide profile having downwardly extending side and rear edges and forming a cambered space therebetween.

12. Ground effect vehicle according to claim 11, characterised in that at least one of the rear edge and side edges of the support body are provided with adjustable flaps (22).

13. Ground effect vehicle according to claim 8, characterised in that the one set of floats (5) and undercarriage units are located under the two lateral ends of the delta wing.

14. Ground effect vehicle according to claim 13, characterised in that the one set of the floats and undercarriage units can be tipped in a vertical plane lying parallel to the direction of travel.

15. Ground effect vehicle according to claim 14, characterised in that the tipping axes (18) of the one set of the floats (5) and undercarriage units are located at the rear ends of the one set.

16. Ground effect vehicle according to claim 14, characterised in that the one set of the floats (5) and undercarriage units are elastically sprung relative to the vehicle.

17. Ground effect vehicle according to claim 16, characterised in that each float (5) consists of an upper shell (20) and a lower shell (19) with a leak-tight mutual engagement, that the upper shell (20) is rigidly connected to the vehicle and that the lower shell (19) is adjustable relative to the upper shell.

18. Ground effect vehicle according to claim 14, characterised in that a piston/cylinder unit (21), which is simultaneously designed as a spring/damper element, is provided for pivoting the one of the floats and undercarriage units.

19. Ground effect vehicle according to claim 8, characterised in that additional structure having support surfaces (24) are provided on both sides of the delta-shaped support body.

* * * * *